United States Patent [19]

Murphy et al.

[11] Patent Number: 5,282,876
[45] Date of Patent: Feb. 1, 1994

[54] INVERSE FLASH STEAM PURIFIER

[75] Inventors: Gary L. Murphy, Camarillo; Robert C. Lovo, Fraser, both of Calif.; Sanjoy Banerjee, Klosters, Switzerland

[73] Assignee: The United States of America as represented by The Secretary of the Navy, Washington, D.C.

[21] Appl. No.: 560,395

[22] Filed: Jul. 31, 1990

[51] Int. Cl.$^5$ .............................................. B01D 47/05
[52] U.S. Cl. .......................................... 95/288; 55/268
[58] Field of Search ................... 55/80, 81, 268, 269, 55/185, 68

[56] References Cited

U.S. PATENT DOCUMENTS 4,214,883  7/1980  Raseley et al. ............... 55/185 X
4,650,502  3/1987  Cole .............................. 55/80 X Primary Examiner—Charles Hart
Attorney, Agent, or Firm—Ron Billi; Melvin J. Sliwka

[57] ABSTRACT

Impure steam is partially cooled on a first side of an energy transfer device, forming a condensate substantially free of $CO_2$ and other non-condensible gases. The condensate is separated from the impure steam and accumulated in a separator/accumulator. The condensate stream is conveyed through a control valve back to a second side of the energy transfer device for reheating to steam substantially free of $CO_2$ and other non-condensible gases.

2 Claims, 1 Drawing Sheet

INVERSE FLASH STEAM PURIFIER

BACKGROUND

Navy ships, as well as commercial and other ocean going vessels, rely extensively on steam for powering the vessels as well as for operating auxiliary systems such as the galley, scullery, space heating, laundry, hot water and boiler blanketing. The steam for powering the vessel and for boiler blanketing must be substantially free of carbon dioxide ($CO_2$) to prevent corrosion. However, most of the other on-board systems do not require this high degree of $CO_2$ free steam.

In order to achieve a steam substantially free of $CO_2$, the feed water from which the steam is produced undergoes comprehensive and expensive water treatment processing such as demineralization/reverse osmosis in order to remove bicarbonates. With the bicarbonates removed from the feed water, the export steam produced from the feed water will be substantially free of $CO_2$ and attain, for example, a near neutral pH of 7 and a conductivity of less than 2 $\mu$mho/cm as compared to a pH of near 4 and a conductivity near 10 $\mu$mho/cm when $CO_2$ is present.

When at sea, on-board water purification systems remove bicarbonates from the feed water so that all the steam produced is substantially free of $CO_2$. However, when ships are in port and berthed at piers, shore boilers produce and provide steam for the ships functions as well as for base facility functions. One of the ship requirements is boiler blanketing (i.e. maintaining steam in the boiler) so that a ship, although berthed, may steam into action without requiring lengthy boiler "fire-up". In this way, Navy ships may maintain battle readiness, necessary to avoid, for example, surprise attack. Unfortunately, boiler blanketing requires steam substantially free of $CO_2$ but most other on-board ship systems as well as base facilities do not. As a result, present practice is to require the shore boilers to produce a steam substantially free of $CO_2$ for boiler blanketing. Accordingly, 95% of the steam produced is unnecessarily purified and supplied for other ship functions and base facilities which do not require a high degree of $CO_2$ free steam.

The present invention, provides a method and apparatus for removing $CO_2$ and other non-condensible gases from steam and produces a gas-free saturated or superheated steam, eliminating gaseous contaminants with minimal energy loss. With the present invention, only the steam for boiler blanketing (and any other system that may require a high degree of $CO_2$ free steam) undergoes treatment; the remaining steam systems, on-board and on-shore, supplied with impure steam.

SUMMARY OF THE INVENTION

Accordingly, it is the object of the present invention to provide a method and apparatus for removing $CO_2$ and other non-condensible gases from steam and produce a gas-free saturated or superheated steam, eliminating gaseous contaminants with minimal energy loss.

More particularly, it is the object of the present invention to provide a method and apparatus that is self contained for condensing a portion of impure steam to pure liquid, separating the pure liquid from the impure steam, accumulating the pure liquid, regulating the flow rate in the system and reheating the pure liquid to obtain a pure steam. This process first involves the partial cooling of impure steam in an energy transfer device that produces a condensate/steam mixture. The next step involves the separation of the pure, condensate liquid phase from the impure, gaseous phase and the accumulation of the pure condensate liquid in a phase separator/accumulator. The next step involves regulating the flow rate of the condensate phase ensure a reservoir of condensate liquid in the separator/accumulator. The final step involves reheating the pure (gas-free) condensate by passing the condensate back through the energy transfer device of step 1 but now, as the cooling medium for the incoming steam thereby reheating the condensate to produce steam, free of $CO_2$ and other non-condensible gases.

DETAILED DESCRIPTION OF THE PREFERRED EMBODIMENT

Figure 1:
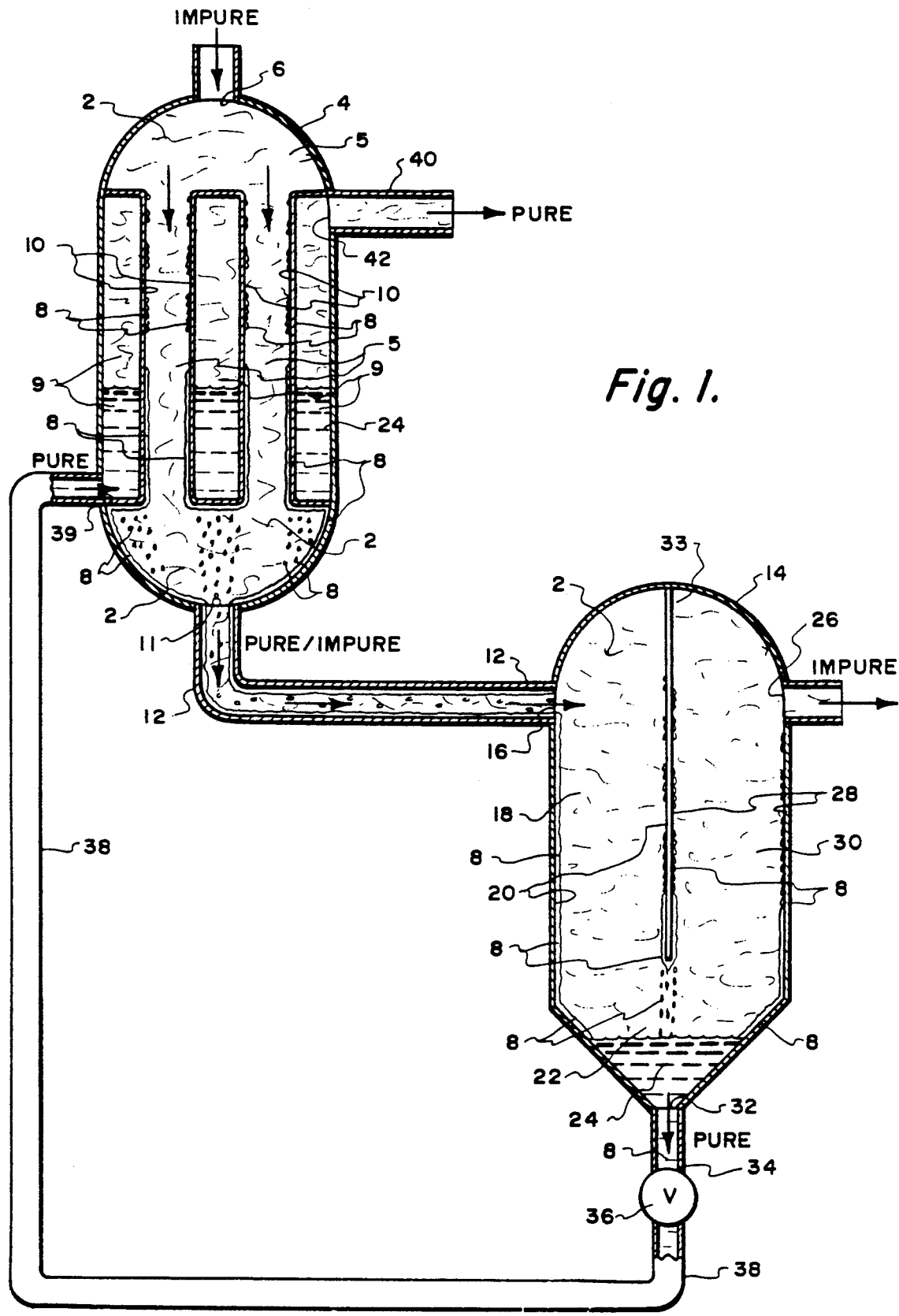
FIG. 1 is a schematic flow diagram of the inverse flash steam purifier system showing the relationship of the components and the pure and impure flow streams.

As shown in FIG. 1, saturated or superheated impure feed steam 2 (comprised of water vapor and, if saturated, liquid) and $CO_2$ and other non-condensible gases (not shown), enter top opening 6 of energy transfer device 4 where feed steam 2 is partially cooled. As a result, liquid condensate 8 forms as droplets and/or film on walls 10 of energy transfer device 4. It should be noted that liquid 8 is "pure", that is, substantially free of $CO_2$ and other non-condensible gases, due to the near insolubility of said gases in liquid 8. As steam 2 flows through energy transfer device 4, liquid 8 continues to form increasing the wetness and liquid/steam ratio. Liquid 8 migrates (as falling droplets and as film), along with steam 2, towards conduit 12. In the preferred embodiment, the temperature of the incoming steam is, for example, approximately 345° F. and the pressure is approximately 110 psig. A suitable and preferred energy transfer device 4 is a single-pass, multitube unit, model number 3215-122, commercially available from Perfex Industrial Products, 2514 South 102nd, P.O. Drawer 27906, West Allis, Wis. 53227.

As shown in FIG. 1, pure liquid 8 and impure steam 2 are then conveyed through opening 11 and conduit 12 into separator/accumulator 14 by way of inlet 16. As the impure steam 2/liquid 8 mixture travels through swirl chamber 18 of separator/accumulator 14, the steam 2/liquid 8 mixture is caused to swirl whereby centrifugal force acts to urge liquid 8 to migrate radially outward to walls 20 of swirl chamber 18. In this way, liquid 8 tends to accumulate on walls 20 where gravity acts to cause liquid 8 to migrate towards bottom chamber 22 and collect as liquid reservoir 24. Impure steam 2 continues to travel through separator/accumulator 14 towards steam outlet 26, with additional liquid 8 forming on walls 28 of exit chamber 30 and migrating into liquid reservoir 24. Impure (gas-rich) steam exits outlet 26, as shown, for use in systems not requiring a high degree of steam purity while pure liquid 8 exits liquid outlet 32 substantially free of $CO_2$. It should be noted that the accumulation of liquid 8 as liquid reservoir 24 effectively acts to seal outlet 32 and prevent the migration of impure steam through outlet 32. In this way, only substantially liquid will be conveyed through outlet 32. Also note that baffle 33 acts to prevent flow short circuiting in separator/accumulator 14 and hence to provide a suitable flow path to assist seperation of liquid 8 and steam 2. A suitable and preferred separator/accumulator 14 is model Type T, commercially available from Wright-Austin Company, 3250 Franklin Street, Detroit, Mich. 48207.

Substantially pure liquid 8, accumulated as liquid reservoir 24, then travels through conduit 34 to control valve 36. The purpose of control valve 36 is to regulate the flow of liquid 8 from separator/accumulator 14 to energy transfer device 4. As a result, liquid 8 is ensured as reservoir 24 in separator/accumulator 14. Control valve 36 may be a passive device or actively controlled, for example, either manually, electronically or pneumatically. A suitable and preferred control valve 36 is Integral Bonnet Needle Valve, model number SS-IVS8, commercially available from Whitey Company, 318 Bishop Road, Highland Heights, Ohio 44143.

Liquid 8 then travels from control valve 36 back to energy transfer device 4, through reheat conduit 38 by way of inlet 39. As liquid 8 travels through energy transfer device 4, heat is transferred (absorbed) from incoming steam 2 whereby liquid 8 is caused to undergo a change in state to steam and exit energy transfer device 4 through conduit 40 by way of outlet 42. It should be noted that energy transfer device 4 includes two separate and distinct "sides": first "side" 5 for receiving steam 2 and cooling and condensing part of steam 2 into liquid 8 and second "side" 9 for receiving and containing liquid 8 for vaporizing liquid 8 back into steam. The heat removed in first "side" 5 is transferred back to liquid 8 in second "side" 9. Accordingly, very little energy loss is realized and the system may be self-contained. The temperature of incoming liquid 8 through inlet 39 is, for example, approximately 325° F. and the temperature of the outgoing steam through outlet 42 is approximately 345° F. As can be seen, the steam exiting conduit 40 is substantially free of $CO_2$ and is suitable for all uses requiring a high degree of $CO_2$ free (as well as other non-condensible gases) steam.

As described, the system produces approximately 90 lbs/hr of pure steam (for a feed steam flow rate of 600 lbs/hr) and may be utilized as a self contained, "in line" system requiring minimal space on the order of approximately three square feet. All conduit material is black iron, schedule 40, with standard threaded fittings. Reheat conduit 38 is approximately $\frac{1}{2}''$ diameter while all other conduit is approximately 1" diameter.

Obviously many modifications and variations of the present invention are possible in the light of the above teachings. It is therefore to be understood that within the scope of the appended claims, the invention may be practiced otherwise than as specifically described.

What is claimed is:

1. A method for removing $CO_2$ and other non-condensible gases from steam, comprising the steps of:
   a) cooling a portion of impure feed steam to form a pure liquid condensate; then
   b) separating the pure liquid condensate from the impure feed steam; then
   c) accumulating said pure liquid condensate; then
   d) controlling the flow rate of said pure liquid condensate; then
   e) reheating said pure liquid condensate to form steam free of $CO_2$ and other non-condensible gases.

2. The method as defined in claim 1, further comprising the step of ensuring a reservoir of said pure liquid condensate.

* * * * *